July 6, 1965    R. R. SZAJ    3,192,792
DRIVE AND POWER TRANSMISSION ARRANGEMENT
Filed Feb. 27, 1964
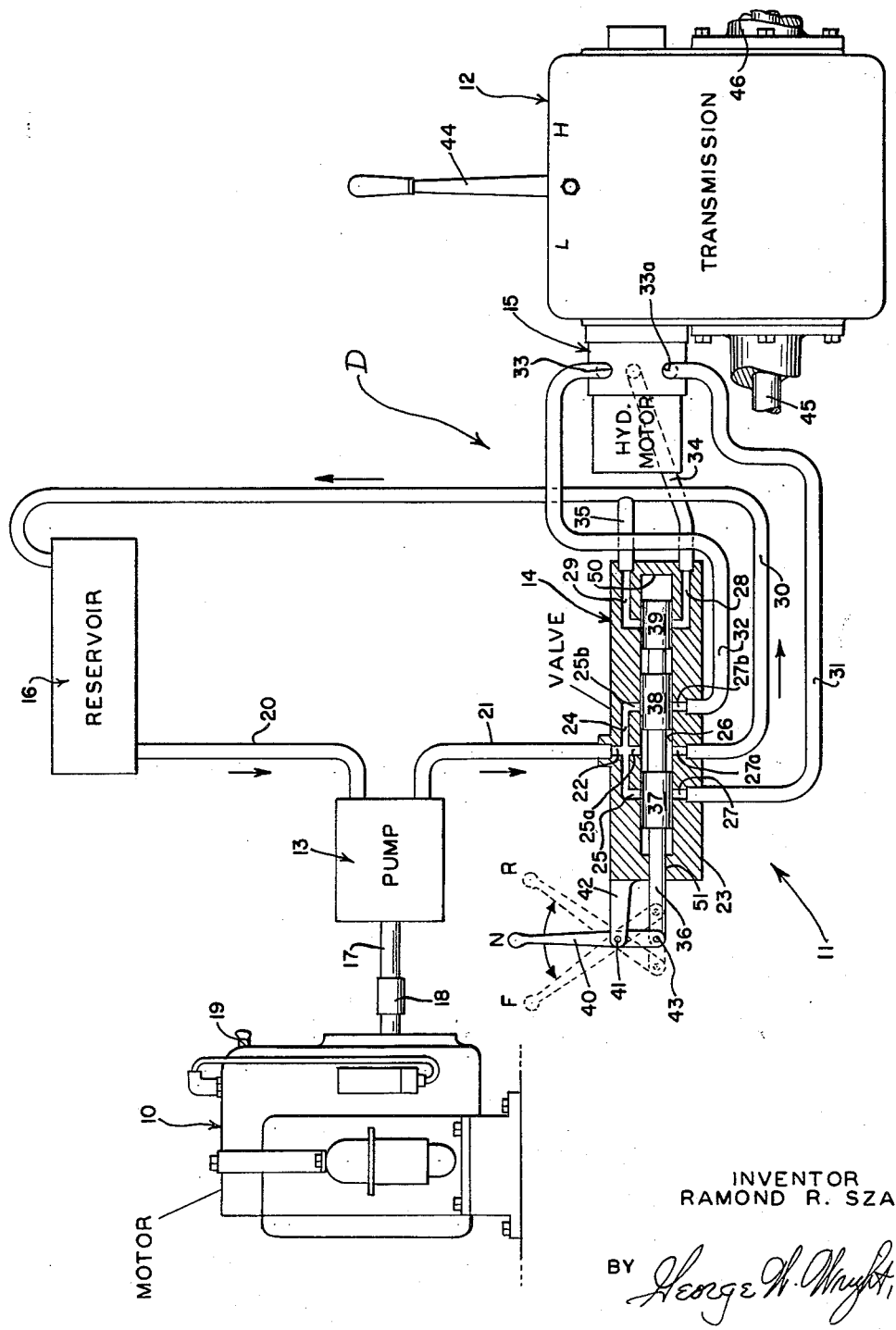
INVENTOR
RAMOND R. SZAJ
BY *George W. Wright, Jr.*

United States Patent Office 3,192,792
Patented July 6, 1965

3,192,792
DRIVE AND POWER TRANSMISSION ARRANGEMENT
Raymond R. Szaj, Hales Corners, Wis., assignor to Colt Manufacturing Company, Inc., Winneconne, Wis., a corporation of Wisconsin
Filed Feb. 27, 1964, Ser. No. 347,899
1 Claim. (Cl. 74—472)

This invention relates to drives and power transmission arrangements and more particularly to new and useful improvements in a multi-purpose combination hydraulic and mechanical drive and power transmission for vehicles and machines. Drive and power transmission arrangements generally are utilized for many things, such as machinery, vehicles and the like, and my novel improvement in the drive and power transmission will find application in these many fields. However, it is extremely useful for adaptation to tractors and the like, and particularly garden tractors utilizing grass cutting equipment and other farming and garden attachments and tools.

To my knowledge, most vehicle drive and power transmissions, particularly for garden tractors utilizing small gasoline engines which provide the power for the grass cutting equipment and other attachments and for powering the vehicles, have considerable difficulty in regulating the speed of the vehicles and the speed or power necessary to rotate the cutter blades and other rotating members of other attachments such as snow blowers, tillers etc. I am also aware of fully hydraulic type transmissions. There is, however, a need for a drive and power transmission arrangement wherein the equipment, such as a grass cutter, can be driven at desired speed without affecting the speed and movement of the vehicle and without the necessity of complicated attachments to achieve this purpose. There is also a great need in this field for providing a drive wherein the speed of the vehicle can be finely controlled separate from the speed required to actuate the grass cutting and other equipment.

It is, therefore, a primary object of my present invention to provide a new and novel drive and power transmission arrangement wherein the prime mover is utilized both to drive a hydraulic pump and to provide the power take-off for extra equipment, and wherein means is provided between the hydraulic pump and transmission of the vehicle to control the speed of rotation of the axles without affecting and regardless of the speed at which the prime mover is running.

Another important object of my present invention is to provide a prime mover and a hydraulic transmission for driving the vehicle axles, within which is interposed a novel hydraulic arrangement which operates and controls the pressure and speed of the fluid to control the transmission regardless of the speed or rate at which the fluid is being pumped through the system by the prime mover.

Still another object of my present invention is to provide a prime mover, a hydraulic system and a transmission for the vehicle, each having separate control means, i.e., a throttle to govern the speed of the prime mover, a valve arrangement to control the direction and speed of the hydraulic system, and means providing a high and low speed in the transmission device, so that the axles driven by the transmission can be rotated at various speeds throughout a wide range in relation to the prime mover, and so that a power take-off for other equipment can be connected directly to the prime mover and be separately regulated regardless of the speed and power of the vehicle.

A further object of my present invention is to provide a novel drive and power transmission arrangement which is simple in construction, reliable in its operation and not liable to get out of order.

With these and other objects in view, and to the end of attaining any other advantages herein appearing, this invention consists in certain features of construction and combination and arrangement of parts hereinafter described, pointed out in the claims and illustrated in the accompanying drawing.

The drawing represents a schematic and diagrammatic view of my novel drive and power transmission arrangement wherein the same is particularly adapted to be utilized with a garden tractor or the like.

Referring to the drawing in detail, the letter D generally indicates the drive and power transmission arrangement and the same includes broadly the motor or prime mover 10, a hydraulic system 11 and a vehicle transmission assembly 12. The hydraulic system 11 includes the hydraulic pump 13, a control valve 14, hydraulic motor 15 in driving connection with the transmission 12 and a reservoir 16 for the hydraulic fluid. This reservoir can be an integral part of the transmission case.

The prime mover or motor 10 can be of any desired type, such as a gasoline motor, diesel motor or even an electric motor; however, in general use it will be a small gasoline driven engine, and the drive shaft 17 thereof is directly connected to the rotor or impeller portion of the hydraulic pump 13 and, secured to the drive shaft 17 is a coupling member 18, to which any type of power take-off (not shown) can be attached to be driven from shaft 17. The engine is also provided with a speed control or throttle means 19. Thus, the speed of rotation of the drive shaft 17 can be controlled and therefore the speed of rotation of any equipment such as the rotor blades of a grass cutter can be controlled by controlling the speed of engine 10.

In the hydraulic system 11 there is provided a supply line or conduit 20 which is in open communication with one end of the reservoir 16, and the impeller of the pump 13 is rotated by the drive shaft 17 in such a direction that fluid will always flow from the reservoir through pipe 20 into the pump 13, and out of the outlet thereof into a discharge pipe or conduit 21 in the direction of the arrows. Pipe 21 is connected and is in communication with a port 22 formed in the valve casing 23 of valve 14. This valve can be of any desired structure and it should be here stressed that the lay-out of the valve is for illustration only and represents a longitudinal vertical section through the valve casing 23 and schematically shows a simple type of hydraulic control which will serve the desired purpose. Thus port 22 connects with a longitudinally extending passageway 24 and this passageway is provided with three spaced inlet ports 25, 25$^a$ and 25$^b$ which open into an enlarged longitudinally extending central chamber 26. Opposite the inlet ports 25 and also in communication with the chamber 26 are the three spaced outlet ports 27, 27$^a$ and 27$^b$. At one end of the valve I provide a port 28 which is in communication with chamber 26 and opposite port 28 is a port 29 which is also in communication with the central chamber 26. From the center outlet port 27$^a$ is connected the return pipe line or conduit 30 which leads directly back and into the reservoir 16 as shown. To the other two outlet ports 27 and 27$^b$, pipe lines 31 and 32 respectively are connected, and at their opposite ends they are connected to the hydraulic motor 15. Pipe lines 31 and 32 are connected in such a manner that when fluid is forced into one of the lines in the present instance 32, the rotor of the hydraulic motor will be driven in a forward direction and when fluid is forced into the other or reverse line 31, the rotor will be driven in the other direction. Both lines 31 and 32 therefore are connected to the inlet 33 and 33$^a$ of the hydraulic motor. From the outlet side of the hydraulic motor I provide a pipe line or exhaust conduit 34 with which port 28 of the valve casing 23 communicates. Port 29 of the valve casing has a short length of pipe 35 which connects it directly with the return line 30 leading to the reservoir 16.

It is apparent from the structure of the valve 14 that it is of the spool type and the same includes a rod 36 on which at predetermined spaced intervals are placed the lands 37, 38 and 39. This rod is mounted for longitudinal movement within the chamber 26 of the valve and it can be shifted by a simple lever arrangement wherein a lever 40 is pivotally supported intermediate its length at 41 by means of ears or the like 42 secured to the casing 23. Its lower end is pivoted at 43 to the rod 36 so that it is apparent that movement of the lever from its full line position to either of its dotted line positions as indicated by the arrows will correspondingly move the lands 37, 38 and 39 which open and close the various ports leading to the chamber 26.

The transmission 12 may be of any known mechanical or hydraulic type but in the preferred form of the invention, the transmission is of the mechanical type having a high and low gear ratio operated by the lever 44, and the hydraulic motor is connected directly to a shaft (not shown) upon which the high and low gears are splined and slidable by means of the lever 44. As stated, the transmission is of the usual vehicle type and drives the axles 45 and 46 which in turn provide the necessary power to turn the rear wheels of the tractor and to propel the same along the ground surface.

From the description so far it can be seen that I have provided a novel arrangement in which only three controls are utilized, a throttle 19 governing the speed of the prime mover 10, a lever 40 for metering the flow of fluid to the hydraulic motor 15 to drive the same forward or rearward and a lever 44 for changing the gear ratio in the transmission for governing the power transmitted to the axles 45 and 46, and when mounted and arranged in a vehicle it will be convenient to have all of the control members (throttle 19, lever 40 and lever 44) neatly arranged in close proximity to one another, as on the dash or control panel of the vehicle.

The operation and use of my device will now be explained, and for purposes of explanation we will assume that the drive and transmission arrangement is associated with a garden tractor or the like, although again it must be borne in mind that my novel arrangement will find uses in many fields, including the machine tool field. However, in a garden tractor the power or prime mover 10 could be a small gasoline powered engine and the same would be mounted in the forward portion of the vehicle and be provided with the usual accessories necessary to the proper functioning of the engine. The drive shaft 17 of the engine 10 would extend rearwardly and the power take-off arrangement would be conveniently located so that a grass cutter or the like could be easily mounted beneath the vehicle and just forward of the operator's position. In any event, it can be seen that the grass cutting equipment is in operative connection at 18 with drive shaft 17, throttle 19 will control the speed of rotation of the grass cutter and if desired it can be run at high speed. Thus, the impeller of the pump 13 will be rotated at different speeds depending upon the power and speed needed for the power cutter, and with the lever 40 in its neutral position indicated by N, hydraulic fluid will be pumped from the reservoir 16 through supply line 20, pump 13, discharge line 21, main inlet port 22, center inlet port 25ª, chamber 26, center outlet port 27ª and into return line 30 where it will be returned to the reservoir in the direction of the arrows. Thus the fluid will be forced in a continual circulation from the pump 13 through valve 14 to the reservoir 16 with no effect in any way on the hydraulic motor 15. In this position of rod 36, and inasmuch as the fluid is in a closed circuit arrangement, flow of fluid through either of the lines 31 or 32 into the hydraulic motor is blocked by lands 37 and 38, respectively, and flow from the line 34 into return line 30 of the reservoir is blocked by land 39, and thus, assuming transmission 12 is in gear, the transmission and axles 45 and 46 are locked and the vehicle is in a standing position and locked in that position so that it cannot inadvertently move forwardly or rearwardly. If it is now desired to move the vehicle forward, and we will assume that the drive shaft 17 is turning at high speed, it will be apparent from the foregoing that by moving the lever 40 toward the dotted line position indicated by the letter F, land 37 will move toward the central inlet port 25ª and opposite outlet port 27 and block the flow of fluid through the same. At the same time, land 37 is of sufficient length so that it will also continue to block the flow of fluid through ports 25 and 27 leading to line 31. However land 38 will open communication between right-hand portions 25ª and 27ᵇ leading to forward line 32 and land 39 will likewise open communication between ports 28 and 29. Thus, with the ports fully open fluid will flow at high speed through the system and particularly through line 32 into the hydraulic motor to drive the rotor thereof in its forward direction at high speed to correspondingly turn the axles 45 and 46. Fluid exhausting from the rotor through line 34 will pass through ports 28 and 29, and line 35 into return line 30 and be fed back into the reservoir. Therefore the vehicle will be moved continuously at a relatively high speed as the circuit is completed from the reservoir through line 20 to pump 13 and line 21. However, it should be noted that the lever 40 need not be moved to its full forward dotted line position wherein the land 39 strikes the wall 50 of the valve but the lever may be moved to positions in between the full forward position and neutral position, and thus the valve and land 38 will only partially open the ports 25 and 27 leading to forward line 32, and land 37 will only partially close the central ports 25ª and 27ª leading to return line 30. Not only will the speed of the fluid being forced through line 32 to the hydraulic motor be controlled but also some pressure will be relieved by directing part of the fluid through the return line 30 at the outlet port 27 of the valve. Thus a very gradual starting and very fine control of the forward motion and speed of the vehicle can be had and this is true regardless of the speed of rotation of the impeller of the pump 13 as a result of the speed of the drive shaft 17.

In order to reverse the movement of the vehicle and obviously to also stop the forward motion thereof, it is first necessary to move lever 40 from its dotted line position F to its neutral full line position. Again all flow through the hydraulic motor is cut off and the vehicle is locked in a standing position. Further movement of the lever 40 in the direction of the letter R will move the land 37 toward the wall 51 of the valve casing 23 and if the lever is moved until the land 37 strikes wall 51, the left inlet port 25 and outlet port 27 leading to reverse line 31 will be fully open and the center inlet port 25ª and outlet port 27ª leading to return line 30 will be fully closed. Once again, ports 28 and 29 will be in open communication with one another due to the fact that the land 39 will be moved to a position where the ports will be open. Thus hydraulic fluid will be forced from the pump 13 through line 21, inlet port 25, outlet port 27, and reverse line 31 into the other side of the hydraulic motor, to rotate the rotor in the opposite direction from that just described, to reverse the rotation of the axles 45 and 46, and thus correspondingly cause the vehicle to move in a backward or reverse motion, and here again the speed of the reverse movement of the vehicle can be finely controlled by metering the flow of fluid to line 31 and allowing fluid to be metered slightly into the return line 30. Also that the vehicle can be moved as fast in a reverse position as in the forward position, and due to the closed circuit of the hydraulic fluid the power transmitted will be positive in nature and the vehicle can accommodate an increased load or accomplish an increased amount of work comparable to a direct drive from the gasoline engine. The speed of the vehicle, however, can be finely controlled even when the gasoline engine must be driven at a high speed to provide the necessary power for the auxiliary attachments. If, however, more pulling power is needed for the axles 45 and 46, then the lever 44 can be moved to the low position and the drive power or torque increased, and this is true whether running in a reverse or forward direction. It should be noted particularly that this throttling effect achieved by moving lever 40 gradually or through part of its range, gives precise control over the movements of axles 45 and 46, and accordingly over any tractor or device in which the system is installed, and will be of great advantage in maneuvering in close quarters, as often required of small tractors using attached mowing equipment.

The two speeds available in transmission 12 are useful in avoiding continuous running of the apparatus with valve 14 in a partially open position. Thus, for use in a garden tractor, for example, the low speed available in transmission 12 could be chosen to give a good average speed for mowing with valve 14 in full forward position, while the high speed could be right for running limited distances on the road. Valve 14 would then need to be partially open for limited periods only, as when starting, moving close to obstructions, shuttling and the like.

Once again, I wish to stress that I do not desire to limit my novel drive and power transmission arrangement exclusively to tractor or like vehicles, but my invention relates primarily to a novel arrangement wherein a prime mover is provided in direct connection with the pump of a hydraulic system and wherein the hydraulic system has interposed between the pump and hydraulic motor utilized for driving a standard transmission, a valve for controlling the speed of the hydraulic motor regardless of the speed at which the fluid is being pumped through the system.

While I have shown and described a specific embodiment of my invention, it will be understood that this is merely for the purpose of illustration and description, and that various other forms may be devised, and that changes may be made in the proportions and minor details of construction without departing from the spirit or scope of my invention and appended claim.

I claim:

A drive and power transmission arrangement including a prime mover, means for regulating the speed of the prime mover, a drive shaft operatively connected to said prime mover, a hydraulic pump having a suction and a discharge side, and a hydraulic system comprising said pump, a reservoir connected with said suction side of said pump, a regulating valve in said system connected with said discharge side of said pump, a reversible hydraulic motor, and a return line from said valve in said system communicating with said reservoir, said valve including a chamber casing, a centrally located fluid chamber within said chamber casing, a valve inlet port communicating with said fluid chamber and with said discharge side of said pump, an outlet port communicating with said valve inlet port, said return line leading from the last-mentioned port providing a continuous flow of fluid from said pump, through said valve and to said reservoir, two additional inlet ports in said valve, communicating with said discharge side of said pump, and two separate outlet ports, each opposite a respective inlet port, a valve element including lands and grooves, slidably received in said chamber casing and shiftable into positions to alternately open one inlet port into communication with its respective outlet port and to simultaneously close the outlet valve port communicating with said return line, to block the flow of fluid from said pump through said valve to said reservoir, pipe lines communicating with said separate outlet ports and with said hydraulic motor, positioned for causing the motor to operate in one direction by reason of fluid flow in one line, or in the other direction by reason of fluid flow in the other line, an exhaust line from said motor communicating with said return line to said reservoir, said valve element having means interposed between said exhaust line from said motor and said return line to close off the flow of fluid from said exhaust line when the first mentioned valve inlet port is in communication with said return line through the first mentioned outlet port, a transmission assembly, a pair of outwardly extending axles operatively connected to said transmission, said hydraulic motor and said transmission being in direct driving relation with each other, means for shifting said valve element whereby the speed and direction of rotation of said axles may be regulated, and said transmission having means for changing from a high to a low gear ratio for further regulating the speed of rotation of said axles regardless of the speed of rotation of said prime mover.

References Cited by the Examiner

UNITED STATES PATENTS

| | | | |
|---|---|---|---|
| 2,153,997 | 4/39 | Verderber et al. | 74—687 |
| 2,719,439 | 10/55 | Driehaus | 74—687 |
| 2,763,164 | 9/56 | Neklutin | 74—687 |

DON A. WAITE, *Primary Examiner.*